US00RE41925E

(19) United States
(12) Reissued Patent
Warther

(10) Patent Number: US RE41,925 E
(45) Date of Reissued Patent: Nov. 16, 2010

(54) INTEGRAL PRINTED SELF-MAILER SHEET PRODUCTS

(75) Inventor: Richard O. Warther, West Chester, PA (US)

(73) Assignee: Vanguard Identification Systems, Inc., West Chester, PA (US)

(21) Appl. No.: 10/040,107

(22) Filed: Jan. 4, 2002

Related U.S. Patent Documents

Reissue of:
(64) Patent No.: 6,010,159
Issued: Jan. 4, 2000
Appl. No.: 09/067,090
Filed: Apr. 27, 1998

U.S. Applications:

(63) Continuation-in-part of application No. 08/724,077, filed on Sep. 30, 1996, now Pat. No. 5,743,567.

(51) Int. Cl.
*B42D 15/00* (2006.01)
B32B 9/00

(52) U.S. Cl. ..... 283/61; 283/62; 283/81

(58) Field of Classification Search ..... 283/61, 283/62, 116, 81, 82, 83, 56, 51, 74, 75, 904; 462/64, 65; 428/42.2, 42.3, 43; 40/299, 638
See application file for complete search history.

(56) References Cited

U.S. PATENT DOCUMENTS 363,390 A 5/1887 Hering
1,240,266 A 9/1917 Stoiber (Continued)

FOREIGN PATENT DOCUMENTS

CA 776047 1/1968
CA 2300241 A1 9/2000

(Continued)

OTHER PUBLICATIONS

Magtek; "*Magtek 21006515 DIP /21006516 SMD (SOIC)—Magnetic Stripe F/2F Read/Decode Integrated Circuit*", Manufacturer's Information Sheet; P/N 99821066–5; 2 pages; (© Copyright 1998), Mag–Tek, Inc.; Carson, CA 90746.

(Continued)

*Primary Examiner*—Willmon Fridie
(74) *Attorney, Agent, or Firm*—Panitch Schwarze Belisario & Nadel LLP

(57) ABSTRACT

An integral printed self-mailer sheet product has a generally planar core formed by first and second core strips of different materials permanently joined together side-by-side by a cover strip. A plurality of variable data fields are printed on the core including at least the name and address of an individual person in a character format and a unique numeric code assigned to the individual person in a machine readable format. Scoring extends through the sheet product in the second core strip to define at least one and typically plural printed element(s) removable from a remainder of the sheet product, each including at least one of the printed variable data fields. The first core strip has a width in a direction perpendicular to the joint greater than and preferably at least twice the width of the second core strip in the same direction so as to completely wrap around the second core strip. The unique name and address may be printed on the first core strip and exposed on the outside of the completed mailer or printed on the second core strip and exposed through a window scored through the first core strip. If printed on the second core strip, the name and address may be included as part of a removable printed element scored in the second core strip. At least one and usually two transparent cover strips are bonded to the second core strip overlapping the outer sides of the scored, removable printed elements.

40 Claims, 8 Drawing Sheets

U.S. PATENT DOCUMENTS

| | | | | | |
|---|---|---|---|---|---|
| 1,253,033 | A | | 1/1918 | Henkle | |
| 1,594,331 | A | | 7/1926 | Henke | |
| 1,795,291 | A | * | 3/1931 | Dunn | |
| 1,957,374 | A | * | 5/1934 | Unger | |
| 2,098,164 | A | | 11/1937 | Rice | |
| 2,256,399 | A | * | 9/1941 | Macharg | 40/703 |
| 2,312,204 | A | * | 2/1943 | Weindel, Jr. | |
| 2,326,939 | A | | 8/1943 | Grafsland | |
| 2,357,641 | A | * | 9/1944 | Evalt | |
| 2,363,472 | A | * | 11/1944 | Ritter | 229/92.8 |
| 2,557,338 | A | | 6/1951 | Caldwell | |
| 2,578,548 | A | | 12/1951 | Histed | |
| 2,616,612 | A | * | 11/1952 | Guttman | |
| 2,812,601 | A | * | 11/1957 | Hines | |
| 2,865,170 | A | * | 12/1958 | Hines | |
| 3,062,431 | A | * | 11/1962 | Rabenold | |
| 3,068,140 | A | * | 12/1962 | Biddle | |
| 3,069,793 | A | | 12/1962 | Francescon | |
| 3,087,267 | A | | 4/1963 | Gustafson | |
| 3,093,296 | A | * | 6/1963 | Wood | |
| 3,130,509 | A | | 4/1964 | Brooks | |
| 3,140,818 | A | * | 7/1964 | Sheldon | |
| 3,152,901 | A | * | 10/1964 | Johnson | |
| 3,211,470 | A | | 10/1965 | Wilson | |
| 3,216,743 | A | | 11/1965 | Morrow et al. | |
| 3,226,862 | A | | 1/1966 | Gabruk | |
| 3,228,129 | A | | 1/1966 | Gwinn et al. | |
| 3,230,649 | A | | 1/1966 | Karn | |
| 3,237,970 | A | * | 3/1966 | Mudd, Jr. | 229/69 |
| 3,350,799 | A | | 11/1967 | Japs | |
| 3,364,049 | A | * | 1/1968 | Desk et al. | |
| 3,461,581 | A | | 8/1969 | Hoffman | |
| 3,537,195 | A | | 11/1970 | Gerds | |
| 3,583,317 | A | * | 6/1971 | Gibson | |
| 3,674,622 | A | * | 7/1972 | Plasse | |
| 3,676,644 | A | * | 7/1972 | Vaccaro et al. | |
| 3,679,448 | A | * | 7/1972 | Tramposch | |
| 3,679,449 | A | * | 7/1972 | Nagot et al. | |
| 3,684,869 | A | * | 8/1972 | Reiter | |
| 3,697,101 | A | * | 10/1972 | Loos et al. | |
| 3,716,439 | A | * | 2/1973 | Maeda | |
| 3,716,440 | A | * | 2/1973 | Ando et al. | |
| 3,808,718 | A | * | 5/1974 | Christiansen | |
| 3,820,261 | A | | 6/1974 | Beall, Jr. | |
| 3,860,796 | A | | 1/1975 | Wallace et al. | |
| 3,895,220 | A | * | 7/1975 | Nelson et al. | |
| 3,902,262 | A | | 9/1975 | Colegrove et al. | |
| 3,946,507 | A | | 3/1976 | Fergg et al. | |
| 3,950,870 | A | | 4/1976 | Heegaard | |
| 3,963,124 | A | | 6/1976 | Banks | |
| 3,995,087 | A | | 11/1976 | Desanzo | |
| 3,999,700 | A | * | 12/1976 | Chalmers | |
| 4,006,050 | A | * | 2/1977 | Hurst et al. | |
| 4,109,143 | A | | 8/1978 | Yamaguchi et al. | |
| 4,149,305 | A | * | 4/1979 | Blumhof | |
| 4,204,639 | A | * | 5/1980 | Barber et al. | |
| 4,214,463 | A | * | 7/1980 | Blumhof | |
| 4,271,352 | A | * | 6/1981 | Thomas | |
| 4,306,433 | A | * | 12/1981 | Kelly | |
| 4,425,772 | A | * | 1/1984 | Brewer | |
| 4,429,015 | A | | 1/1984 | Sheptak | |
| 4,443,027 | A | | 4/1984 | McNeely et al. | |
| 4,521,981 | A | * | 6/1985 | Kasprzycki et al. | |
| 4,523,088 | A | * | 6/1985 | Utsch et al. | |
| 4,536,013 | A | * | 8/1985 | Haghiri-Therani et al. | |
| 4,545,838 | A | | 10/1985 | Minkus et al. | |
| 4,589,687 | A | * | 5/1986 | Hannon | |
| 4,594,125 | A | | 6/1986 | Watson | |
| 4,608,288 | A | | 8/1986 | Spindler | |
| 4,630,067 | A | * | 12/1986 | Teraoka | |
| 4,631,845 | A | | 12/1986 | Samuel et al. | |
| 4,637,635 | A | * | 1/1987 | Levine | |
| 4,637,712 | A | * | 1/1987 | Arnold et al. | |
| 4,641,347 | A | * | 2/1987 | Clark et al. | |
| 4,645,916 | A | | 2/1987 | Raisleger | |
| 4,653,775 | A | * | 3/1987 | Raphael et al. | |
| 4,695,077 | A | | 9/1987 | Pretre | |
| 4,712,929 | A | * | 12/1987 | Kitaoka | |
| 4,746,830 | A | | 5/1988 | Holland | |
| 4,765,653 | A | * | 8/1988 | Fasham et al. | 283/116 X |
| 4,806,740 | A | | 2/1989 | Gold et al. | |
| 4,824,142 | A | | 4/1989 | Dossche | |
| 4,842,304 | A | * | 6/1989 | Jones | |
| 4,854,610 | A | | 8/1989 | Kwiatek | |
| 4,857,121 | A | * | 8/1989 | Markley et al. | |
| 4,863,196 | A | | 9/1989 | Ohnishi et al. | |
| 4,869,946 | A | | 9/1989 | Clay | |
| 4,887,763 | A | * | 12/1989 | Sano | |
| 4,889,367 | A | | 12/1989 | Miller | |
| 4,889,749 | A | | 12/1989 | Ohashi et al. | |
| 4,904,853 | A | * | 2/1990 | Yokokawa | 283/904 X |
| D310,849 | S | | 9/1990 | Davis | |
| 4,978,146 | A | | 12/1990 | Warther et al. | |
| 4,986,868 | A | | 1/1991 | Schmidt | |
| 4,995,642 | A | | 2/1991 | Juszak et al. | |
| 4,998,753 | A | | 3/1991 | Wichael | |
| 5,078,828 | A | | 1/1992 | Marglin | |
| 5,114,187 | A | | 5/1992 | Branch | |
| 5,156,726 | A | * | 10/1992 | Talbott | |
| 5,180,824 | A | | 1/1993 | Bauman et al. | |
| 5,195,123 | A | | 3/1993 | Clement | |
| 5,204,513 | A | | 4/1993 | Steele | |
| 5,271,643 | A | | 12/1993 | Hafele | |
| 5,271,787 | A | * | 12/1993 | Hoffmann et al. | 283/116 X |
| 5,294,041 | A | * | 3/1994 | Whiteside | |
| 5,356,717 | A | | 10/1994 | Choki et al. | |
| 5,439,255 | A | * | 8/1995 | McIntire et al. | |
| 5,476,420 | A | * | 12/1995 | Manning | 462/64 X |
| 5,489,123 | A | * | 2/1996 | Roshkoff | |
| 5,495,981 | A | * | 3/1996 | Warther | |
| 5,507,526 | A | * | 4/1996 | Petkovsek | |
| 5,529,345 | A | * | 6/1996 | Kohls | 283/62 X |
| 5,533,459 | A | * | 7/1996 | Fontana | 283/81 X |
| 5,609,253 | A | | 3/1997 | Goade, Sr. | |
| 5,662,976 | A | | 9/1997 | Popat et al. | |
| 5,720,158 | A | | 2/1998 | Goade, Sr. | |
| 5,743,567 | A | | 4/1998 | Warther | |
| 5,769,457 | A | | 6/1998 | Warther et al. | |
| 5,863,076 | A | | 1/1999 | Warther | |
| 5,868,430 | A | | 2/1999 | Kolosvary | |
| 5,887,904 | A | * | 3/1999 | Petkovsek | 462/65 X |
| 6,010,159 | A | | 1/2000 | Warther | |
| 6,039,356 | A | | 3/2000 | Warther et al. | |
| 6,050,605 | A | | 4/2000 | Mikelionis et al. | |
| 6,089,611 | A | | 7/2000 | Blank | |
| 6,095,567 | A | | 8/2000 | Buell | |
| 6,099,043 | A | | 8/2000 | Story | |
| 6,305,716 | B1 | | 10/2001 | Warther et al. | |
| D461,477 | S | | 8/2002 | Pentz et al. | |
| D462,966 | S | | 9/2002 | Pentz et al. | |
| 6,471,127 | B2 | | 10/2002 | Pentz et al. | |
| D467,247 | S | | 12/2002 | Pentz et al. | |
| 6,588,658 | B1 | | 7/2003 | Blank | |
| 6,769,718 | B1 | | 8/2004 | Warther et al. | |

FOREIGN PATENT DOCUMENTS

| | | | |
|---|---|---|---|
| DE | WO 84/04493 | | 11/1984 |
| ER | 0024344 | | 8/1979 |
| FR | 1594331 | | 6/1970 |
| FR | 2225001 | * | 10/1994 |
| GB | 1548588 | | 7/1979 |

| | | | |
|---|---|---|---|
| GB | 2 213 770 | | 12/1988 |
| GB | 2235412 | | 3/1991 |
| GB | 2254045 | | 9/1992 |
| GB | 2269340 | | 2/1994 |
| GB | 2281714 | | 3/1995 |
| GB | 2289865 | | 12/1995 |
| JP | 2-265796 | * | 10/1990 |
| WO | 89/07052 | * | 8/1989 |

OTHER PUBLICATIONS

Magtek; "*Magtek 21006505 DIP /21006506 SMD* (*SOIC Wide*)*—Magnetic Stripe F/2F Read/Decode Integrated Circuit",* Manufacturer's Information Sheet; P/N 99821065–1; 2 pages; (© Copyright 1993), Mag–Tek, Inc.; Carson, CA 90746.

AXIOHM™—American Magnetics; "*Model C702E/C712E/C712EHC —Model C702KP/C712KP—Magstripe® Swipe Reader/Writer Intelligent Series";* Manufacturer's Operation Instructions; 19 pages; (© Copyright 1998), AXIOHM Transaction Solutions, Inc.; Cypress, CA 90630.

ISO/IEC; "*International Standard—ISO/IEC 7811–2—Identification Cards—Recording Technique",* Part 2, Reference No. ISO/IEC 7811–2–1995(E); 17 pages; (Second Edition Aug. 15, 1995); Geneva, Switzerland.

DL Working Group; "NCITS B10.8/99–029"; Redmond Meeting Minutes; 12 pages; (Aug. 18–19, 1999) Redmond, Washington.

DL Working Group; "NCITS B10.8/99–018";Deerfield Meeting Minutes; 12 pages; (Apr. 29, 1999); Deerfield, Illinois.

A. Wickser, reprint of article entitled, "In Printing Sealed Labels, Don't Tamper with Success", *Printing Impressions,* North American Publishing Company, Philadelphia, PA, Mar. 1994, 1 page.

Reprint of article entitled, "Anographics applies tamper–evident expertise", *Converting Magazine,* Delta Communications, Inc., Jan./Feb., 1984, 4 pages.

J. Miner, reprint of article entitled, "Computer–Imprintable Labels Come Of Age", *Paper Film & Foil Converter,* Feb. 1985, 1 page.

J. Miner, reprint of article entitled, "To Print, or Not To Print", *ID Systems,* North American Technology, Inc., Mar. 1987, 2 pages.

J. Miner, reprint of article entitled, "Don't Overlook Benefits of Preprinted Labels", *Automatic I.D. News,* Mar./Apr. 1987, 1 page.

Reprint of article entitled, "P–S Label Converter Finds Its Own Way", *Converting Magazine,* Delta Communications, Inc., Jun. 1989, 4 pages.

J. Miner, reprint of article entitled, "Photocomposed Labels Offer Bar Code Benefits", *Automatic I.D. News Insight,* Jun. 1990 1 page (33).

Photocopy—Video Home Theater membership form, The Vanguard Group of Printing Companies, Exton, PA, Sep. 19, 1988, 2 pages.

Single sheet entitled "000363 Stop & Shop Video (Card)" "001–Sets" "07/17/8".

Photocopy of mailer insert entitled "Blockbuster Universal Membership Card", Stik/Strip Laminating Co., Inc., Edmond, OK, Jul. 1994 (2 pp.).*

Catalog sheet "The Prodigy Label Printer", Fargo Electronics, Incorporated, Prairie, MN, 1990, 2 sides.*

H. Bailey and B. Wray, "Photographic Bar Code labels", *Identification Journal,* Jan./Feb. 1988, pp. 16–19.*

* cited by examiner

FIG. 9
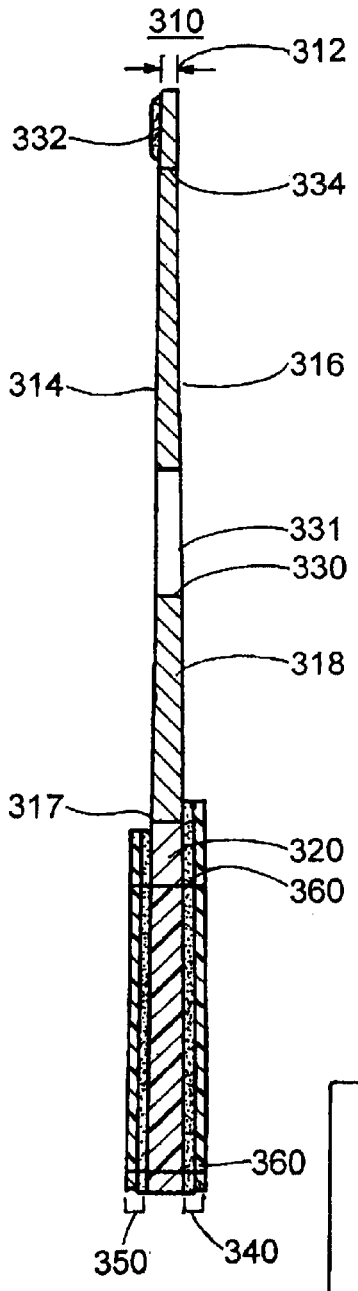
FIG. 10
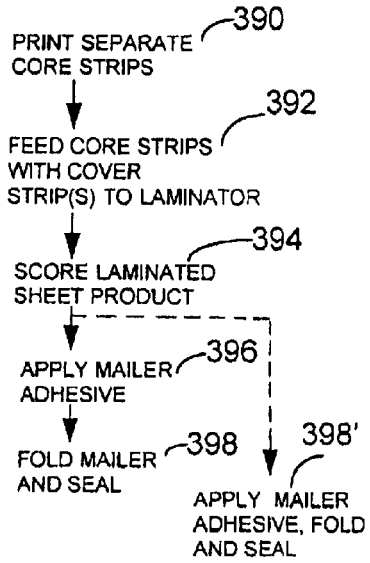
Amended FIG. 13
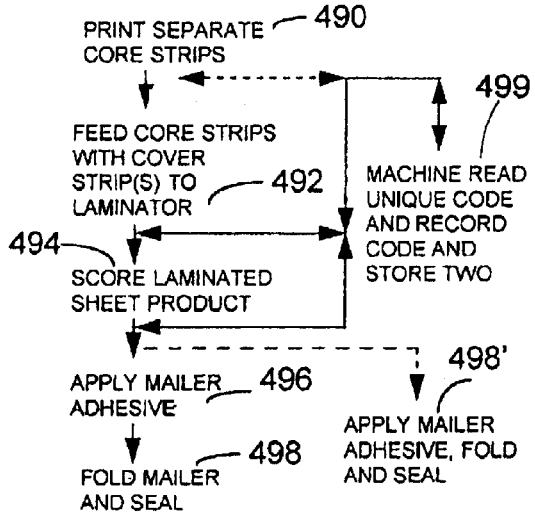
FIG. 11
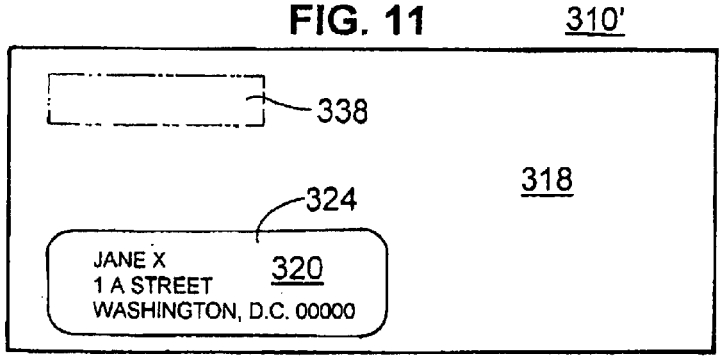

Amended FIG. 12

INTEGRAL PRINTED SELF-MAILER SHEET PRODUCTS

Matter enclosed in heavy brackets [ ] appears in the original patent but forms no part of this reissue specification; matter printed in italics indicates the additions made by reissue.

RELATED APPLICATION(S)

This application is a continuation-in-part of U.S. application Ser. No. 08/724,077 filed Sep. 30, 1996, now U.S. Pat. No. 5,743,567 *and U.S. application Ser. No. 08/911,806, filed Aug. 15, 1997, now U.S. Pat. No. 5,863,076.*

BACKGROUND of THE INVENTION

The present invention relates to sheet products and, in particular, to printed mailers, particularly those in the form of sheet products with sets of uniquely encoded transaction cards, tags, labels and/or other removable printed elements.

A substantial market has developed in recent years for inexpensively manufactured, individually encoded transaction cards for such uses as store credit cards, membership cards, I.D. cards, etc. Such cards typically bear a unique code in a bar code format to permit automatic machine scanning of the codes. Such cards typically were supplied in sheets of multiple sets with one or more labels, adhesive tags, etc. being supplied with each set and bearing the same individual code number as the transaction elements for attachment to separate application forms, membership lists, etc.

U.S. Pat. No. 4,978,146 discloses, among other things, a printed sheet product including multiple, removable, transaction cards, which each bear a unique code in both machine readable format (e.g. bar code) as well as conventional human readable characters and adhesive labels printed on and cut from the same sheet and the same material of the sheet forming the core of the transaction cards. An adhesive backing is provided along the sheet underlying the labels so that the labels can be removed and attached to an application form, a membership list, or other record bearing information identifying the recipient of the transaction card(s). The core of the single sheet would be printed with the unique codes of each transaction element and label in one pass, thereby ensuring complete integrity between the codes of each card and each adjoining label.

In addition to distributing these transaction cards at point of sale locations, they have been distributed by mail. U.S. Pat. No. 5,495,981 discloses the manufacturer of such cards and key tag elements in mailer insert form, several of which can be simultaneously made in a larger sheet and then cut from the sheet and individually tipped into conventional business envelopes with windows. In such mailers, the person to whom the uniquely encoded card is being provided is printed with the unique code assigned to that individual at the same time while the mailers are being created to insure 100% integrity. To reduce costs, the mailer inserts can be made from two different materials and joined together by lamination.

SUMMARY OF THE INVENTION

In one aspect the invention is an integral printed self-mailer sheet product comprising: a generally planar core having first and second opposing major planar sides, the core being formed by first and second core strips of different materials positioned side-by-side, the planar core being printed on its major sides with a plurality of variable data fields, at least a first variable data field being printed with a name and address of an individual person and at least a second variable data field being printed with a unique numeric code in a machine readable format assigned the individual person, at least two of the plurality of variable data fields being printed on the second core strip; a first cover strip permanently fixed to one major side of each of the first and second core strips irremovably holding adjoining ends of the first and second core strips together in a joint to define the generally planar core, the first cover strip only partially covering one major side of the first core strip and at least partially covering one major side of the second core strip; scoring extending at least sufficiently through the sheet product in the second core strip to define at least a first printed element removable from a remainder of the sheet product, the first removable printed element including only a portion of the second core strip bearing at least one of the at least two variable data fields printed on the second core strip; the second core strip having a width in a direction perpendicular to the joint between the first and second core strips and a length in direction parallel to the joint; and the first core strip having a width in a direction perpendicular to the joint at least twice as great as the width of the second core strip.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings which are diagrammatic:

FIG. 9 is a cross-sectional view taken along the lines 9—9 in FIG. 8;

FIG. 10 is a block diagram of one possible set of steps for fabricating the sheet product of FIGS. 8 and 9;

FIG. 11 is a front elevation of the mailer made with the sheet product of FIGS. 8–9;

DETAILED DESCRIPTION OF EMBODIMENTS

Figure 1:
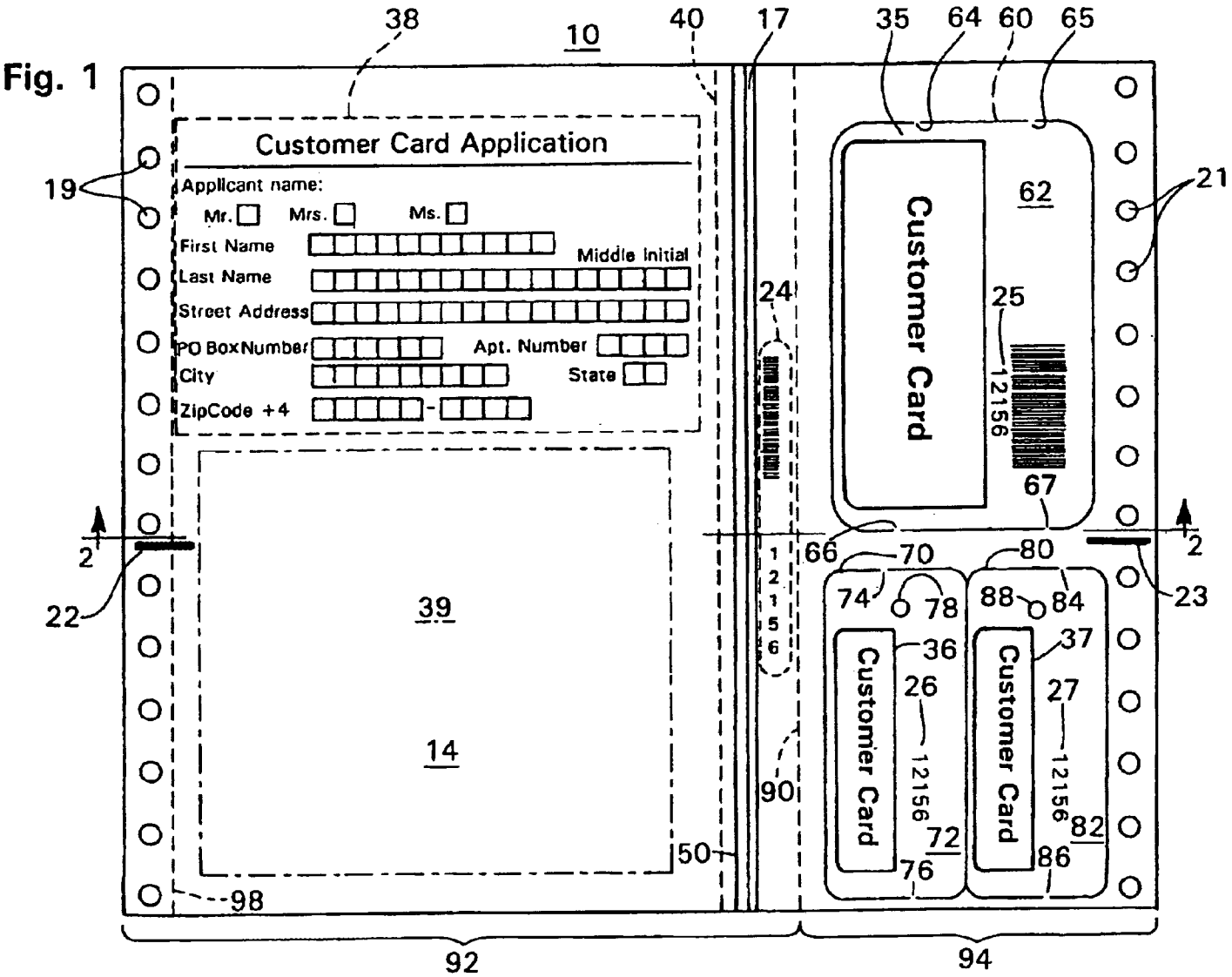
FIG. 1 is a first major planar side of a first embodiment individual printed sheet product of the invention.

Certain terminology is used in the following description for convenience only and is not limiting. The words "right,"

"left," "lower" and "upper" designate directions in the drawings to which reference is made. The words "inwardly" and "outwardly" refer to directions toward and away from, respectively, the geometric center of the and designated parts thereof. The terminology includes the words above specifically mentioned, derivatives thereof and words of similar import. U.S. patent application Ser. No. 08/482,634, filed Jun. 7, 1995, is incorporated by reference herein.

Figure 2:
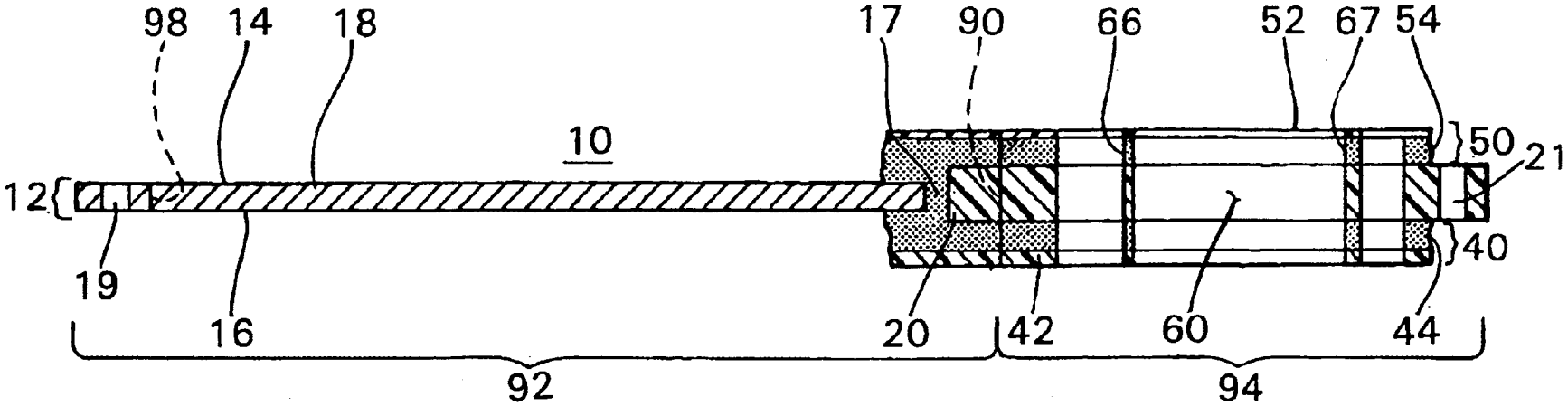
FIG. 2 is a cross section taken along the lines 2—2 in FIG. 1.

In the drawings, like numerals indicate like elements. FIGS. 1 and 2 depict an integral, individual printed sheet product 10 of the present invention which is an application form that maintains the integrity of the identification of uniquely encoded transaction card elements when the form is completed. Sheet product 10 is merely one of a number which would be produced at the same time in a manner to be subsequently described, each with a different unique code.

The individual sheet product 10 includes a planar core indicated generally at 12 having first and second opposing major planar sides 14 and 16, the first or "front" major planar side 14 being seen in FIG. 1. As is best shown in FIG. 2, core 12 is formed by first and second core strips 18, 20. The core strips 18, 20 are planar and flexible and, according to an important aspect of the invention, are of different materials each of which can accept printing. The strips 18 and 20 are positioned side-by-side, to define preferably monolayer core 12 of one thickness of material with a junction or joint 17. Machine or tractor feed holes 19 and 21 are located along the free side edge margins of each strip 18 and 20, respectively.

Referring back to FIG. 1, the second core strip 20 is printed on the first major planar side 14 of the core 12 with a plurality of spaced-apart, variable data fields, four variable data fields being identified at 24, 25, 26 and 27. Each variable data field 24–27 is printed with a unique code and the codes printed in the variable data field 24–27 are identical, namely, "12156" in the indicated example. The variable data fields 24–27 constitute a set. The location of the variable data fields 24–27 would remain the same in each sheet product 10 but the unique code printed in the fields would change from sheet product 10 to sheet product. In addition to being printed in human readable characters, the codes are printed in machine readable formats, bar codes being depicted in the first and second variable data fields 24, 25.

In addition to the variable data fields 24–27, the sheet product 10 includes printed static graphic fields 35–39. The static graphic fields 35–39 would remain unchanged from printed sheet product 10 to printed sheet product within a plurality or set or run of such products 10. Fields 35–37 of the second strip 20 are associated with the second, third and fourth variable data fields 25–27, respectively. The first core strip 18 has preprinted static graphic fields indicated generally at 38 and 39. Static graphic field 38 is an identification block preprinted to indicate where on the first core strip 18, a name and address of an individual is manually entered to identify an individual to whom the unique code of the sheet product 10 is assigned. The particular formats of the various static graphic fields 34–39 are not important to the present invention beyond the provision on the first planar strip 18 of a location to manually enter an identification of an individual to whom the unique code of the sheet product 10 is assigned. Also, preferably printed on each core strip 18 and 20 is at least one visible optical alignment mark 22 and 23, respectively.

Referring back to FIG. 2, a first cover strip indicated generally at 40 is integrally secured to each of the first and second core strips 18 and 20 holding the first and second core strips 18, 20 in side-by-side position as shown in FIGS. 1 and 2. The first cover strip 40 partially covers the second or "rear" major planar side 16 of the core 12 and at least partially covers each of the first and second core strips 18 and 20 while preferably extending completely across the second major planar side 16 and each of the first and second core strips 18 and 20 (top to bottom in FIG. 1). The first cover strip 40 covers enough of each of the first and second core strips 18 and 20 to assure that each is integrally secured with the other. The first cover strip 40 may be provided by a polymer film 42 and an appropriate adhesive layer 44.

In the depicted embodiment 10, a second cover strip 50 is integrally secured to each of the first and second core strips 18 and 20, partially covering the first, front major planar side 14 of the core 12 and each of the first and second core strips 18 and 20, extending completely across the first major side 14 and each of the first and second core strips 18 and 20, again top to bottom in FIG. 1. In embodiment 10, both cover strips extend essentially the full width of second core strip 20 within the holes 21.

Still referring to FIG. 1, scoring indicated generally at 60 is provided in the sheet product 10 and extends at least sufficiently through and along the sheet product 10 and through the second core strip 20 and, in this embodiment 10, through the provided first cover strip 40 and the second cover strip 50, to define at least one transaction card element 62 removable from a remainder of the sheet product 10. The scoring 60 separates the second variable data field 25 from the other data fields 24, 26, 27.

The removable card element 62 includes at least the second variable data field 25 of the plurality of variable data fields 24–27 but only a portion of second core strip 20, the first cover strip 40 and the second cover strip 50, if provided. Preferably, one or more bridges of continuous material 64–67 spanning the removable card element 62 and the remainder of the sheet product 10 on opposite sides of the card element 62 releasably retain the card element 62 in the sheet product 10 until removed. Scoring indicated at 70 and at 80 through the sheet product 10 in the second core strip 20, define two smaller card elements 72, 82, respectively, which are also removable from the sheet product 10. Each is printed with a separate variable data field 26, 27 each bearing the code, "12156", which is unique to sheet product 10 and common to all of its variable data fields 24–27. Again, bridges 74, 76 and 84, 86 at opposing ends of each card element 72, 82 releasably retain each element 72, 82 in the sheet product 10 until the elements 72, 82 are manually removed by breaking the bridges. Preferably, each card element 72, 82 is provided with a closed perimeter opening 78, 88 by the scoring to enable the element 72, 82 to be attached to a key ring or other key holder (neither depicted).

Still referring to FIG. 1, according to another important aspect of the present invention, a line of perforations 90 or other line of weakness extends across the sheet product 10 and sufficiently through the second core strip 20, the first cover strip 40 and the second cover strip 50, if provided, to define first and second separable sheet components 92 and 94. At least one of the printed variable data fields, the first variable data field 24 in this embodiment, is not made part of any removable card element 62, 72, 82 but instead is left on an integral remainder of the sheet product 10 which includes the first core strip 18. The first separable sheet component 92 is integral and includes the entirety of the first core strip 14 and a portion of the second core strip 20 including the first printed variable data field 24. The second separable component 94 includes each of the removable card elements 62, 72 and 82 and a scrap portion of the second core strip 16, which is connected to and releasably retains each of the removable card elements 62, 72, 82. The second separable component 94 can be separated from the first component 92 and given to a customer or client who keeps the removable card element (s) 62, 72, 82. The first separable sheet component 92 is retained with identification information of the individual to whom the second separable sheet component 94 was given. The first variable data field 24 with the code unique to all of the removable card elements 62, 72, 82 remains attached with the identification information (which is manually entered into the static graphic field 38) and kept as a permanent record by the card provider. If desired, a vertical line of perforations 98 or other form of line of weakness can be provided along the free side edge of the first core strip 18 to permit separation of a distal edge portion of the first core strip 18 with the tractor feed holes 19.

Specific manufacturing details and materials, including preferred materials and manufacturing techniques, have been disclosed in prior U.S. Pat. Nos. 4,978,146 and/or 5,495,981 and application Ser. No. 08/482,634, each of which is incorporated by reference herein in its entirety. Suggestedly, first core strip 18 comprises and, preferably, consists essentially of cellulose material, namely paper stock, to reduce the overall cost of the product 10. The second core strip 20 comprises a polymer material stiffer and thicker than the paper sheet stock to provide stiffness and thickness to the card elements 62, 72, 82. The polymer material is one that accepts printing, preferably one which accepts laser printing. Strip 20 preferably consists essentially of such polymer material.

The first cover strip 40 on the second or rear major planar side 16 of the planar core 12 suggestedly comprises or consists essentially of a polymer film carrier 42 bonded to core 12 with an appropriate adhesive 44. Polyester provides good strength, wear and soil resistance properties to the outer surface of each of the removable card element 62, 72, 82. However, if durability of the removable element(s) is not a factor and reduced cost would be advantageous, the polymer film carrier 42 of the first cover strip 40 can be a less expensive material such as conventional cellophane or 3M brand magic invisible or transparent tape or any of their industry equivalents with a pressure sensitive adhesive. If provided, the second cover strip 50 on the first, front major planar side 14 of the core 12 and sheet product 10 would suggestedly be a more durable, polyester material that is transparent to visible light or at least infrared light so that the variable data fields beneath the cover strip 50 can be seen by humans, if desired, or at least read by machine such as by infrared scanner.

Sheet product 10 of FIGS. 1 and 2 having polyester cover strips 40 and 50, would be preferred where providing the most durable, removable card elements 62, 72 and 82 and sheet product 10 was desired. While strip 50 is shown to extend over the junction 17 between the first and second core strips 18 and 20, only one of the two cover strips, first cover strip 40, need span the junction 17 between the two core strips 18 and 20 for purposes of the present invention. The first cover strip 40 need only have a width sufficient to span the junction 17 to assure that the core strips 18 and 20 remain together during manufacture and use. Cover strip 40 need not extend so far as the scoring 60, 70, 80 or even perforations 90.

Similarly, cover strip 50 need not be provided at all. The primary purpose for providing second cover strip 50 is to protect the faces of the removable card element 62, 72 and 82 and to further prevent tampering with the printed variable data fields. Second cover strip 50 need only span the second core strip 20 overlapping the scoring 60, 70 and 80 defining the removable card elements 62, 72 and 82. The left edge of cover strip 50 might, for example, terminate at a location between the scoring 60 and the first printed variable data field 24, or at a location to the left of variable data field 24 spanning the scoring 60 and first variable data field 24.

Figure 3:
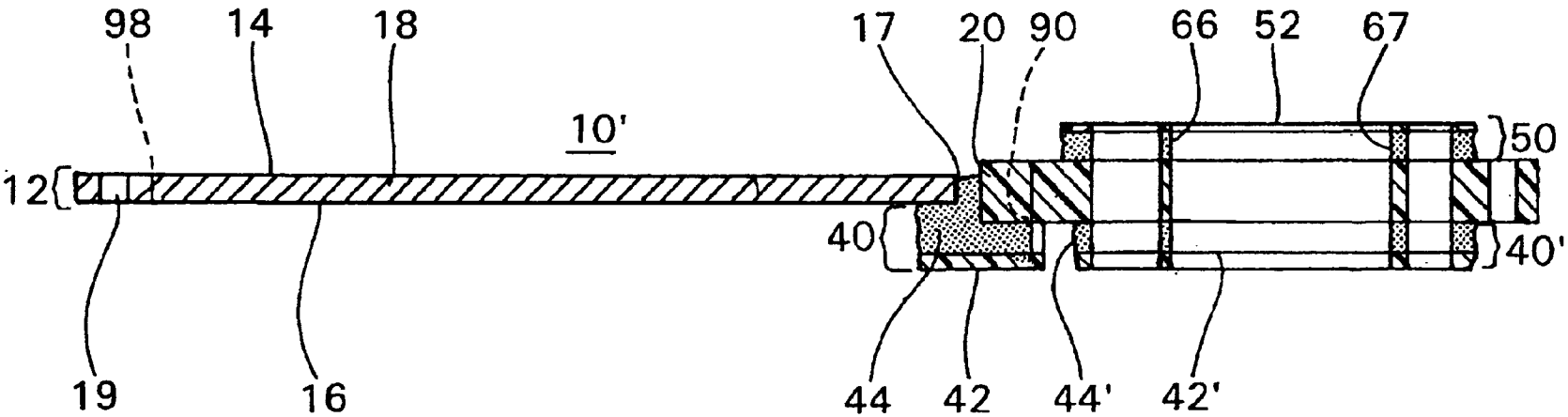
FIG. 3 is a cross section like that of FIG. 2 of another sheet product of the present invention.

FIG. 3 is a cross sectional view similar to FIG. 2 of an alternate sheet product 10' including the same core 12 formed of the same core strips 18 and 20. Sheet product 10' further has, in addition to a first, relatively narrow cover strip 40 spanning the junction 17 between the core strips 18 and 20 and a second cover strip 50 on the front side 18 of the core, a third cover strip 40' on the rear planar side 16 of the sheet product 10' covering only the portion of the second core strip 20 including the removable card element(s) 62, 72, 82, etc. The second core strip 50 would only be sufficiently wide to also cover those removable card elements. The first variable data field 24 would remain coupled with the first core strip 18 by only first cover strip 40. Cover strip 40 would preferably be the less expensive cellophane or other transparent, adhesive tape.

Sheet products 10 and 10' may be manufactured in a variety of ways. The present invention provides sheet products 10, 10' which may be manufactured more quickly and inexpensively and with greater data integrity than previous similar products. The present invention is most valuable where a large number of individual sheet products, e.g. thousands need to be or can be manufactured at a given time or in a single run to fill an order.

Figure 4:
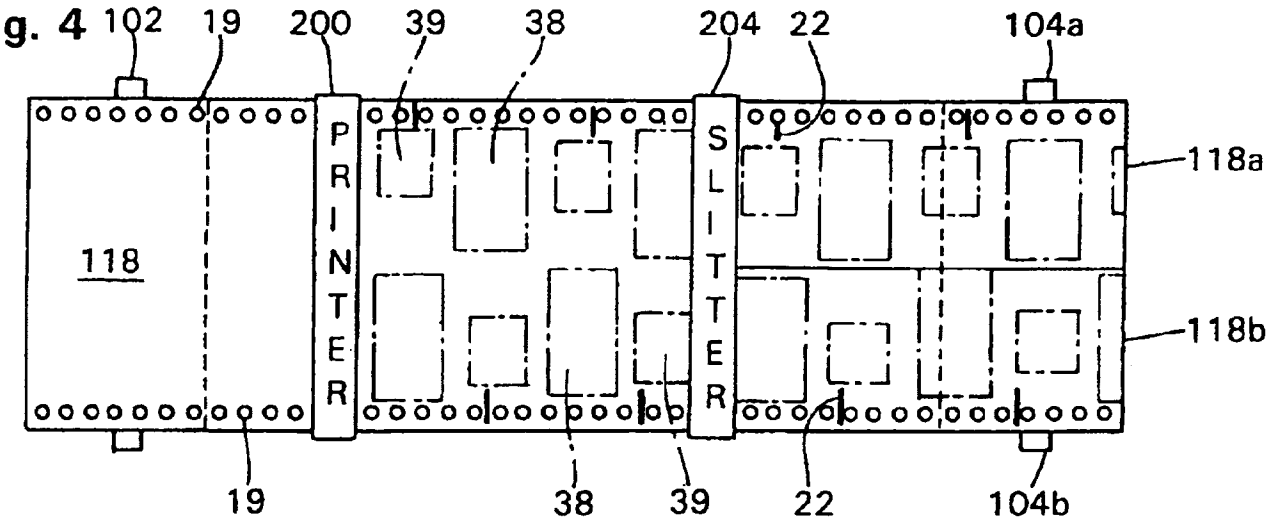
FIG. 4 depicts manufacture of a portion of a continuous length of a first printed sheet material.

One preferred method of forming sheet products 10, 10' is now explained with reference to FIGS. 4–6. Referring to FIG. 4, a continuous strip 118 of paper stock is fed from a single continuous roll 102 and is printed in a conventional fashion, such as offset printed, with consecutive sets of the static graphic fields 38, 39 and optical marks 22 found on the first core strip 18 of the sheet products 10, 10'. Strip 118 can have a width equal to the width of core strip 18. However, for convenience and reduced cost, it may be desirable to simultaneously print two or more columns of the static graphic fields 38, 39 in opposite or reversed directions on the elongated continuous strip 118 which can thereafter be slit into separate, elongated strips 118a, 118b, which can be simultaneously wound on separate rolls 104a, 104b. Machine or tractor feed holes can be supplied originally in strip 118 as depicted or added at any time during or after the process. Printing two columns of static graphic fields on paper stock supplied with tractor holes 19 along the side edges is very effective. The elongated flexible imprinted feed stock 118 such as paper with tractor holes 19, along its two lateral side edges is continuously fed through an offset printer 200 which prints two columns of consecutive sets of static graphic fields 38, 39 and optical alignment marks 22, side-by-side but facing in opposite directions along stock 118. Stock 118 may be simultaneously or consecutively printed with sets of static data fields at the same uniform intervals on both of its major sides. The printed stock is then passed through a slitter 204, which splits the stock 118 longitudinally through its center to provide two separate strips 118a, 118b of continuous stock each bearing consecutive sets of the static graphic fields 38, 39.

Figure 5:
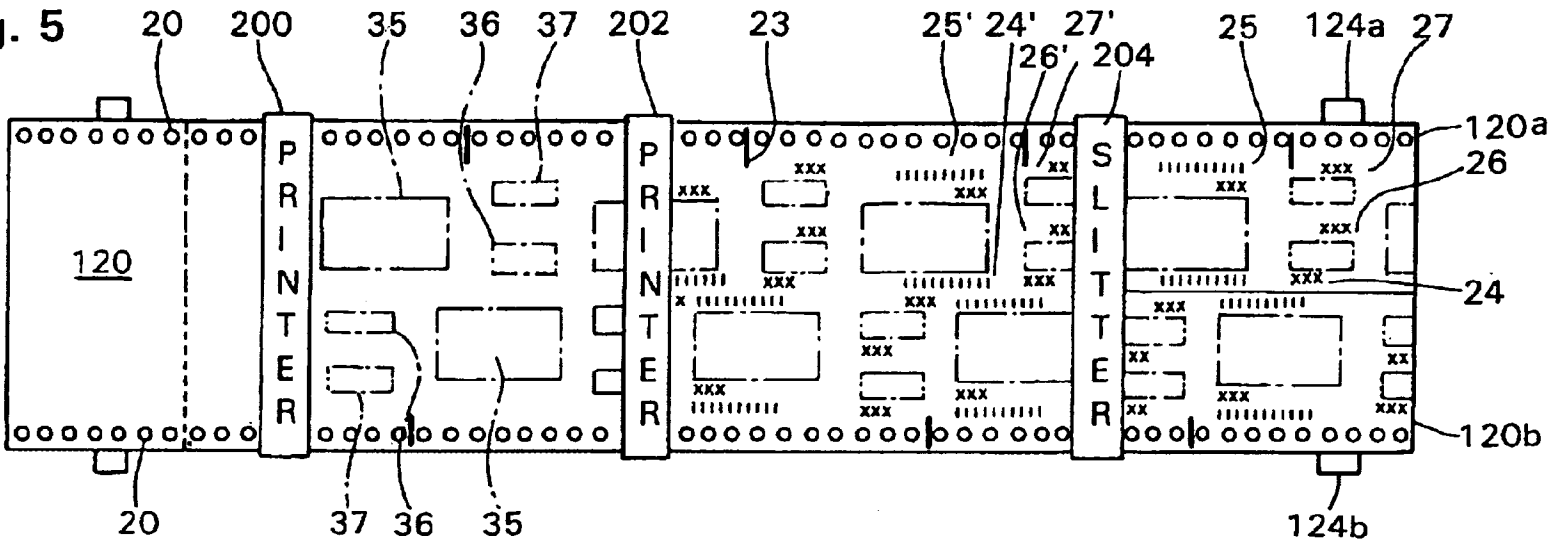
FIG. 5 depicts manufacture of a portion of a continuous length of a second printed sheet material.

Referring to FIG. 5, an elongated continuous strip 120 of the selected polymer material used to provide second core strip 20 is offset printed with at least one column and preferably two columns of sets of static graphic fields 35–37. Because the identified polymer strip materials tend to stretch, tractor or machine feed holes 20 should provided along both free edges of elongated strip 120 and used to control the tensioning of the strip 120 during processing to obtain a uniform stretch of the strip 120 such that the static graphic fields and variable data fields are in alignment. Strip 120 preferably is first offset printed with consecutive side-by-side sets of the static graphic fields 35–37 and optical alignment marks 23, again facing in opposite or reversed directions. Next, the elongated strip 120 is preferably run through a variable data field printer 202, such as a computer controlled laser printer, which prints sets of the variable data fields 24–27, 24'–27', etc. on the strip 120, incrementing the code of each variable data field set as it is printed. Next, strip 120 is preferably slit into two separate strips 120a, 120b, which are simultaneously wound into separate rolls 124a, 124b. Again, strip 120 can be offset and laser printed on one or both major planar sides simultaneously or sequentially, then slit and separately wound in two rolls in a single continuous operation as shown. Optical marks can be printed in either fashion.

Figure 6:
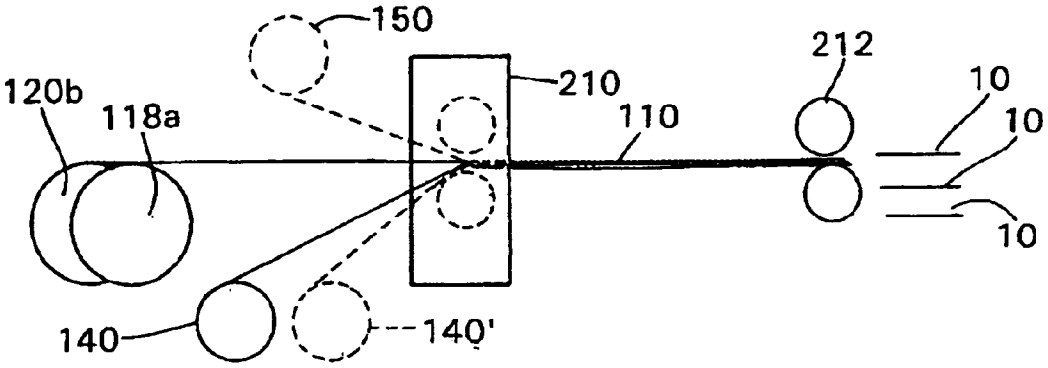
FIG. 6 depicts manufacture of a plurality of the sheet products of the present invention using the printed sheet materials of FIGS. 4 and 5.

Referring to FIG. 6, one strip from each of the two sets printed strips 118a, 118b and 120a, 120b are fed with at least one and up to three elongated cover strips 140, 150, 140' through a bonder 206 which may be a pair of nip rolls where only cover strips with a pressure sensitive adhesive is being used or heated roll(s) or lighted roll(s) where, for example, a polyester continuous strip 140 and/or 150, 140' with more aggressive heat or light activated adhesive is used to laminate cover strip(s) 140, 150 and/or 140' to core strips 118a and/or 120b. Preferably, the paper elongated core strip 118a is simply fed at a desired processing speed through the bonder 206. Second elongated core strip 120b would be fed under tension at a speed to match the speed of paper core strip 118a. Optical marks 22 on elongated strip 118a and marks 23 on strip 120b can be used to control the feed speed of strip 120b to strip 118a to keep the various printed field sets in alignment. After bonding, the resulting elongated, continuous, intermediate sheet product 110 can be scored to define a plurality of the individual sheet products 10 (or 10') with removable transaction cards 62, 72, 82 and perforation lines 90, 98 by conventional means, such as opposing roll cutters 208.

Figure 7:
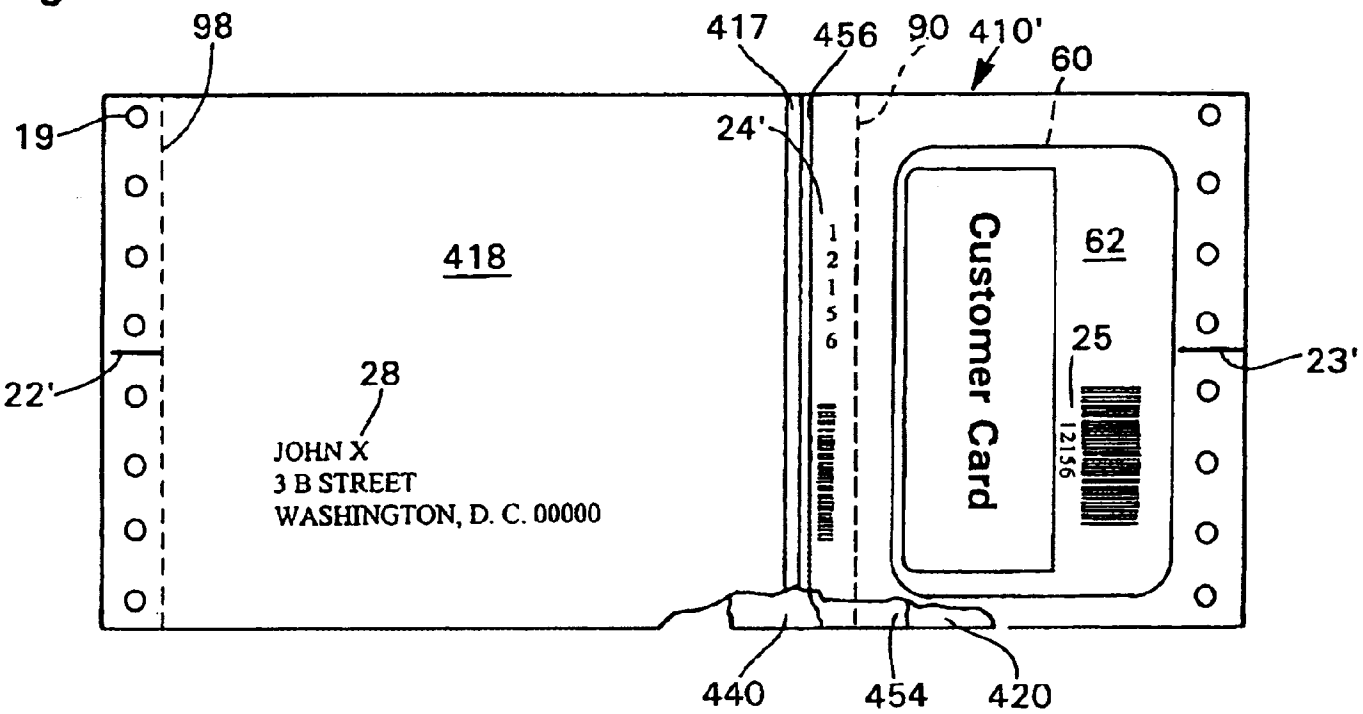
FIG. 7 depicts another individual sheet product of the present invention.

In addition to making the sheet products 10, 10' previously described, the aforesaid method of using an inexpensive polymer film tape with pressure sensitive adhesive could also be used to join together strips of different materials, both of which are printed with variable data fields like the sheet products 410 of U.S. Pat. No. 5,495,981, to reduce the costs of such sheet products. One such individual sheet product 410' is shown in FIG. 7 and indicated at 210 herein. Sheet product 210 has a cross section like sheet product 10' of FIG. 3 except that the first core sheet indicated at 218 in FIG. 7 bears, in addition to any static graphic field, a variable data field 28 with the printed name and address of an individual to whom the transaction card 62 is being assigned. This product permits the individual core strips 218 and 220 to be separately printed, for example, the information for core strip 218 to be supplied by a business seeking to distribute the transaction card and the strip 220 being supplied by the card manufacturer. The resulting sheet product 210 can be used as a mailer with a standard size envelope as indicated in U.S. Pat. No. 5,495,981. Individual sheet products 210 can be fabricated using continuous core strips in the manner previously described which, after joining, can be scored to separate the individual card sheet products 210 and define the removable transaction card elements. In such embodiments, the core strips 218 and 220 would be joined at their junction by a thin, inexpensive adhesive tape 240 and the more expensive polyester cover strips 254, 256 applied only over the front and rear sides of the portion of second core strip 220 that include the removable card element(s) 62.

Figure 8:
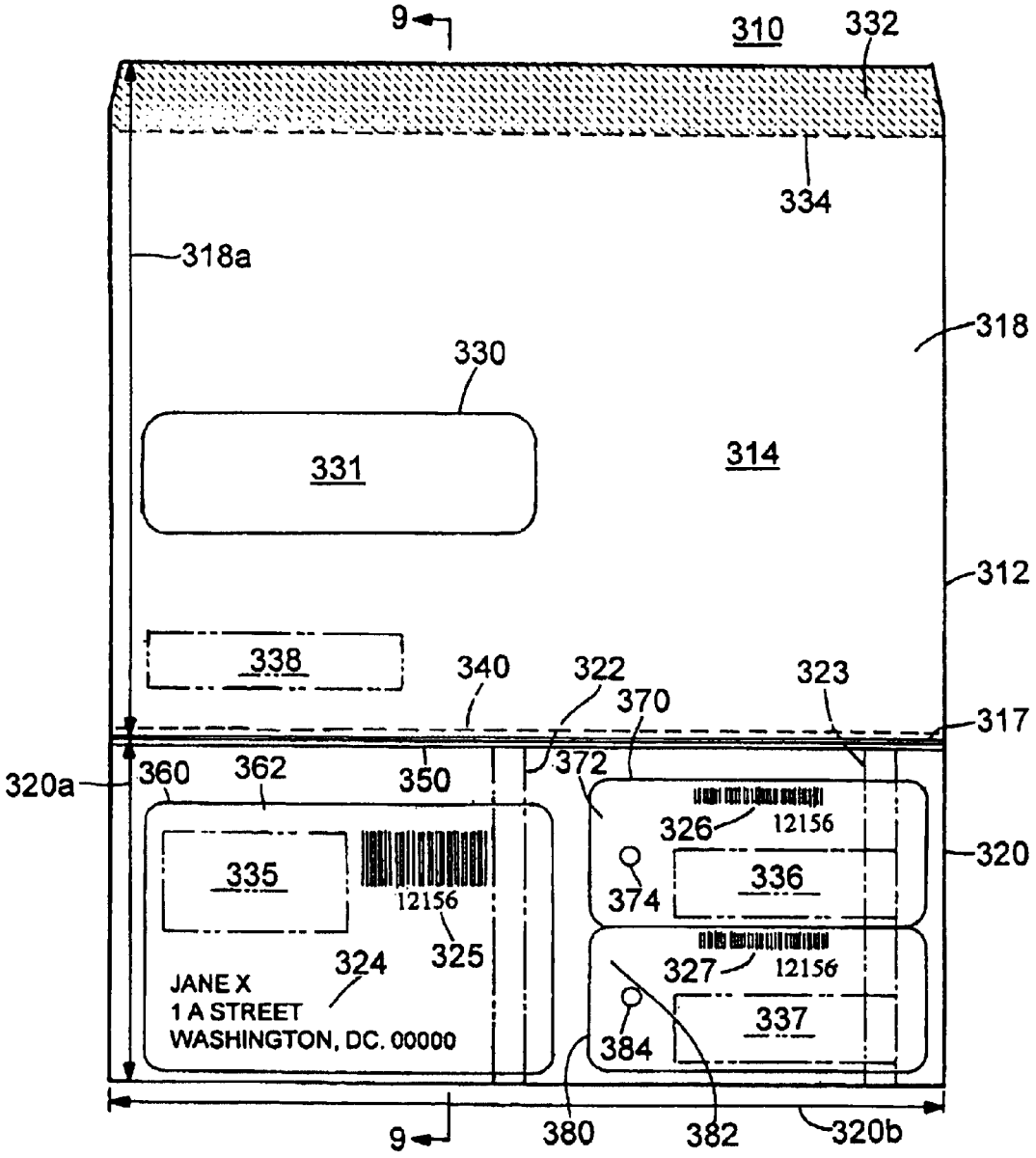
FIG. 8 is a plan view of a first integral printed self-mailer sheet product of the present invention.

FIGS. 8 and 9 depict a first integral printed self-mailer sheet product of the present invention indicated generally at 310. The product 310 includes an at least generally planar core 312 having first and second opposing major planar sides 314 and 316, the first or "front" major planar side being seen in FIG. 8. The core 312 is again formed by first and second core strips 318, 320 which planar, flexible and of different materials, preferably each of which can accept printing. As is best seen in FIG. 9, the strips 318 and 320 are preferably positioned side-by-side, to define a preferably monolayer core 312 of two materials with a junction or joint indicated by a broken line 317 between them. Machine or tractor feed holes 319, 321 in phantom, like holes 19 and 21 of FIGS. 1–5 and 7, may be provided for continuous feed fabrication of products 310 or may be omitted as indicated in FIGS. 8 and 9 for sheet feed.

The second core strip 320 is printed on the first major planar side 314 with a plurality of spaced-apart variable data fields, four of which are identified at 324, 325, 326 and 327. According to this invention, at least one of the variable data fields, variable data field is 324, is printed with the name and address of an individual person. Also according to the present invention, at least one other variable data field and preferably at least a plurality of the other variable data fields are printed with a unique, preferably numeric code, which is uniquely assigned to the individual identified in the first variable data field 324. The remaining three variable data fields 325–327 of product 310 are printed with the same unique code, namely "12156". Further, according to the present invention, the unique numeric code is preferably printed in at least a machine readable format in at least one of the variable data fields and in a character format in at least a separate one of the variable data fields. Preferably the unique code is printed in both machine readable and character formats in all code fields 325–327 as indicated. In addition to machine readable bar code format, the unique code can be printed in other, machine readable formats including, but not limited to, magnetic stripe printing. A pair of magnetic stripe tapes are indicated in phantom at 321 and 322 extending entirely across the second core strip 320.

In addition to the variable data fields 324–327, the sheet product 310 preferably include a plurality of printed static graphic fields 335–338. These would remain unchanged from printed sheet product to printed sheet product within a plurality or set or run of such products 310. Static graphic field 335 is associated with variable data fields 324 and 325. Static graphic fields 336 and 337 are associated with variable data fields 326 and 327, respectively. Static graphic field at 328 is separate, could be printed on either side 314, 316 of the sheet product 310 and is a return address for the mailer. Static graphic fields can be provided on either or both sides 314, 316 as can variable data fields.

Referring to FIG. 9, a first cover strip indicated generally at 340 is permanently fixed to each of the first and second core strips 318 and 320, holding the strips 318, 320 in a preferably side-by-side, monolayer position to define the at least generally planar core 312. The first cover strip 340 partially covers the second or "rear" major planar side 316 of the core 312. It further only partially covers one side of the first core strip 318 and at least partially covers one side of the second core strip 320 while preferably extending completely across the second major planar side 316 of the core 312 and at least part of the second core strip 320, in one or two mutually perpendicular directions, namely a direction generally parallel to joint 317. The first cover strip 340 again covers at least enough of each of the first and second core strips 318 and 320 to assure that each is integrally secured with the other. Preferably the first cover strip covers each removable element of the second core strip as will be explained. The first cover strip 340 may again be provided by a polymer film 42 and an appropriate adhesive 44.

A second cover strip 350 is preferably further provided and is further permanently fixed to the core 312 and the second core strip 320, partially covering the first "front" major planar side 314 of the core 312 and at least part of the second core strip 320, preferably extending completely across the first major planar side 314 in only one of two mutually perpendicular directions and entirely across the second core strip 320 in the same direction, namely parallel to the joint 317.

Scoring indicated generally at 360 is provided in the sheet product 310 and extends at least sufficiently through and along the sheet product 310, the second core strip 320 and through the provided first and second cover strips 340 and 350, to define at least one element 362 removable from a remainder of the sheet product 310. Scoring separates the first and second variable data fields 324 and 325 from the other variable data fields 326 and 327. Removable card element 362 preferably includes each of the first and second variable data fields 324 and 325, at least one static graphic field 335 and only portions of each of the second core strip 320, the first cover strip 340 and the second cover strip 350 (if provided). Further scoring indicated at 370 and 380 through the sheet product 310 is further preferably provided to define two smaller elements 372 and 382, respectively, which are also removable from a remainder of the sheet product 310. Each element 372, 382 is printed with a separate static graphic field 336 and 337, respectively, and a separate variable data field 326 and 327, respectively, each bearing the code which is unique to the sheet product 310 and common to all of the unique code variable data fields 325–327. The scoring further preferably provides closed perimeter key ring openings 378 and 388, respectively through each element 372, 382.

The second core strip 320 has a width in a width dimension indicated at 320a which is perpendicular to the joint 317 between the first and second core strips 318 and 320, and a length in a length dimension 320b, which perpendicular to the width dimension 320a. According to an important part of the invention, the first core strip 318 has a width in a width dimension 318a also perpendicular to the joint 317 which is greater than the width of the second core strip 320 and preferably, at least twice the width of the second core strip in its width dimension 320a so that the first core strip 318 may be wrapped at least once completely around the second core strip 320 to form a fully wrapped mailer. Preferably, first core strip 318 has a width more than twice the width of the second core strip 320 so that the first core strip 318 wraps more than once completely around the second core strip 320. Scoring indicated generally at 330 further preferably defines a closed perimeter cutout forming a window 331 extending completely through the first core strip 318 and located on the first core strip 318 to overlap the name and address of the first variable data field 324 when the first core strip 318 is wrapped around the second core strip 320. An adhesive layer indicated by stippling at 322 may be provided at the free edge of the first core strip 318 remote from the joint 317 on an appropriate side (314) before the sheet product 310 is folded or while the sheet product 310 is being folded. A line 334 of perforations or other suitable weakness can further be provided extending across the length of the first core strip 318 proximal at the free end to permit easy opening of the mailer. After fabrication of the planar sheet product 310 in the form shown in FIGS. 8–9, the sheet product 310 can then be folded a plurality of times to form a one piece mailer indicated at 310' in FIG. 11, including an insert element provided by second core strip 320 and an outer wrapper provided by first core strip 318.

FIG. 9 depicts in block diagram form the steps of assembly of the sheet product 310. The first and second core strips 318 and 320 are first separately prepared in a manner similar to the preparation of core strips 18 and 20 of the first embodiment described above, including printing with the static graphic fields 333 and 335–337 and the variable data fields 324–327 as indicated at step 290. The static graphic field 335–337 and variable data fields 324–327 may be printed simultaneously or sequentially. The individual core strips 318 and 320 are fed to a laminator in step 392 which applies the first cover strip and any additional cover strips, if provided. The laminated blank is passed preferably through a die which scores the laminated product defining the individual removable elements 362, 372 and 382, the window 331, the line 334 of perforations or other weaknesses and the key ring holes 374 and 384. This scoring can further be used to bevel the two outer corners at first core strip 318 remote from the joint 317, if desired. Adhesive layer 332 can then be separately applied at step 396 and the product shipped unfolded for later folding at a step 398. Alternatively, sheet product 310 can be folded and sealed in one combined operation as indicated in phantom at 398'.

Figure 12:
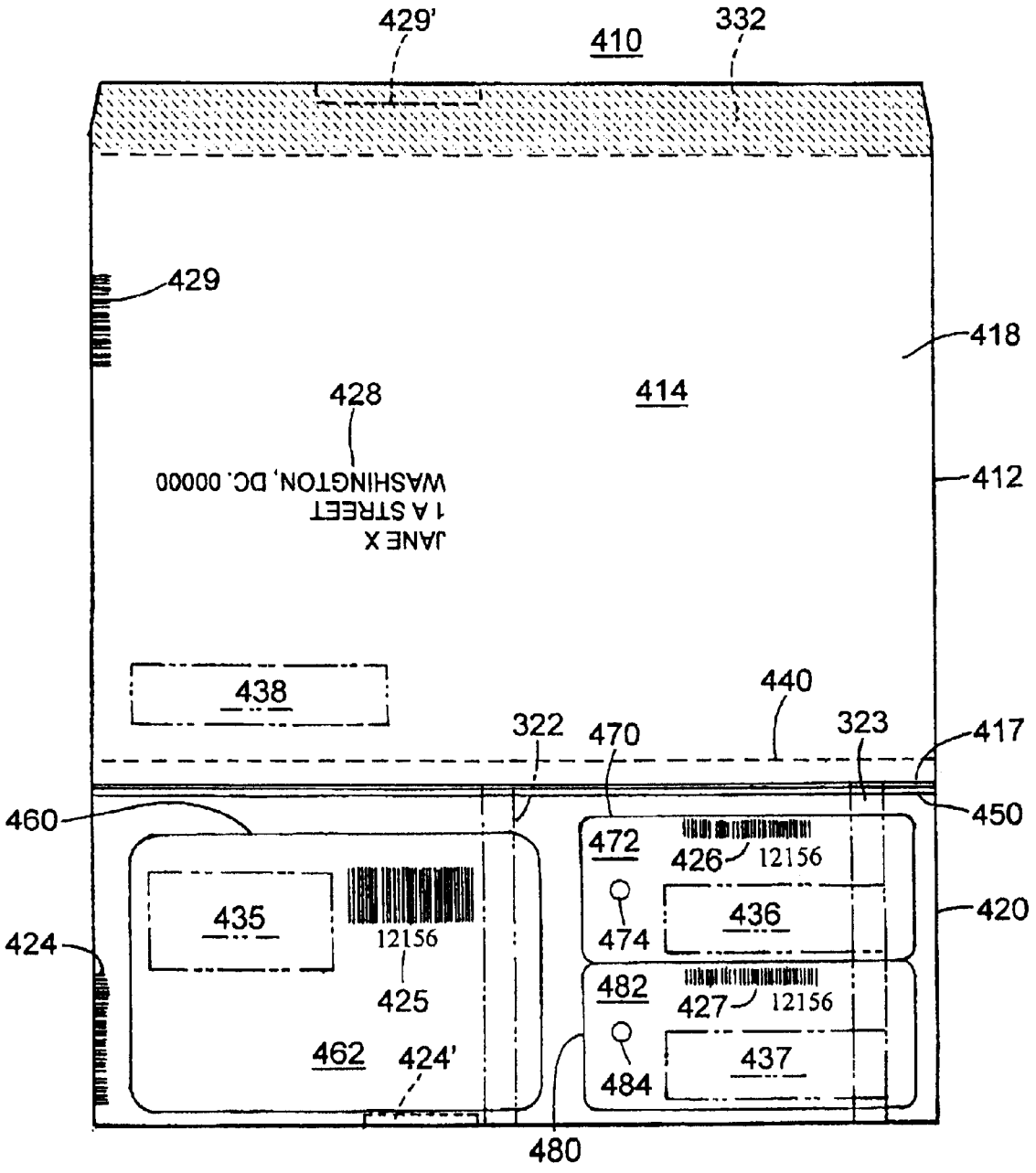
FIG. 12 is a plan view of a second integral printed self-mailer sheet product of the present invention.

FIG. 12 depicts a second integral printed self-mailer sheet product of the present invention indicated at 410. It again includes an at least generally planar core 312 having two opposing major, at least generally planar sides, one of which is indicated at 414. Planar core 412 is again formed by first and second core strips 418, 420, which are planar, flexible and of different materials, preferably each of which can accept printing, to define a preferably monolayer core of the two materials 418, 420 with joint 417 between them. First cover strip 340 permanently fixes the two core strips 418, 420 together, only partially covers the first core strip 418 and covers at least part and preferably all of the second core strip 420, or at least all of its removable elements. Second core strip 450 is preferably provided preferably covering at least the opposite sides of the elements removable from the second core strip and can lap onto an edge of the first core strip.

The second core strip 420 is printed on the first major planar side 414 of the core with a plurality of spaced-apart variable data fields, four of which are identified at 424–427, each containing the same unique code. That code is printed in at least one of a machine-readable formal, a character-readable format or both formats for at least variable data fields 425–427. There is further preferably printed on one of the major sides of the first core strip 318, fifth and sixth variable data fields 428 and 429. Variable data field 428 contains the unique name and address of an individual person to whom the mailer is addressed while variable data field 429 contains a unique record number identifying that individual in a data set containing a multiplicity of such individuals each identified by a different record number. Variable data field 428 is printed in character format while the record number printed in the variable data field 429 is printed in a machine-readable format, preferably a bar code, along the same edge of the core 312 bearing the first variable data field 424. An adhesive layer 432 and line of perforations 434 are again provided. Sheet product 410 is otherwise similar to sheet product 310. First and second cover strips scoring 460, 470 and 480 define first, second and third elements 462, 464 and 466 removable from the remainder of the sheet product 410. Each element 362, 372, 382 bears one of the variable data fields 325–327 and further preferably includes one of the static graphic fields 436–438. Again, the scorings further preferably define closed perimeter key ring holes 474 and 484 in key tag elements 472 and 482, which are smaller than the transaction card element 462.

Figure 13:
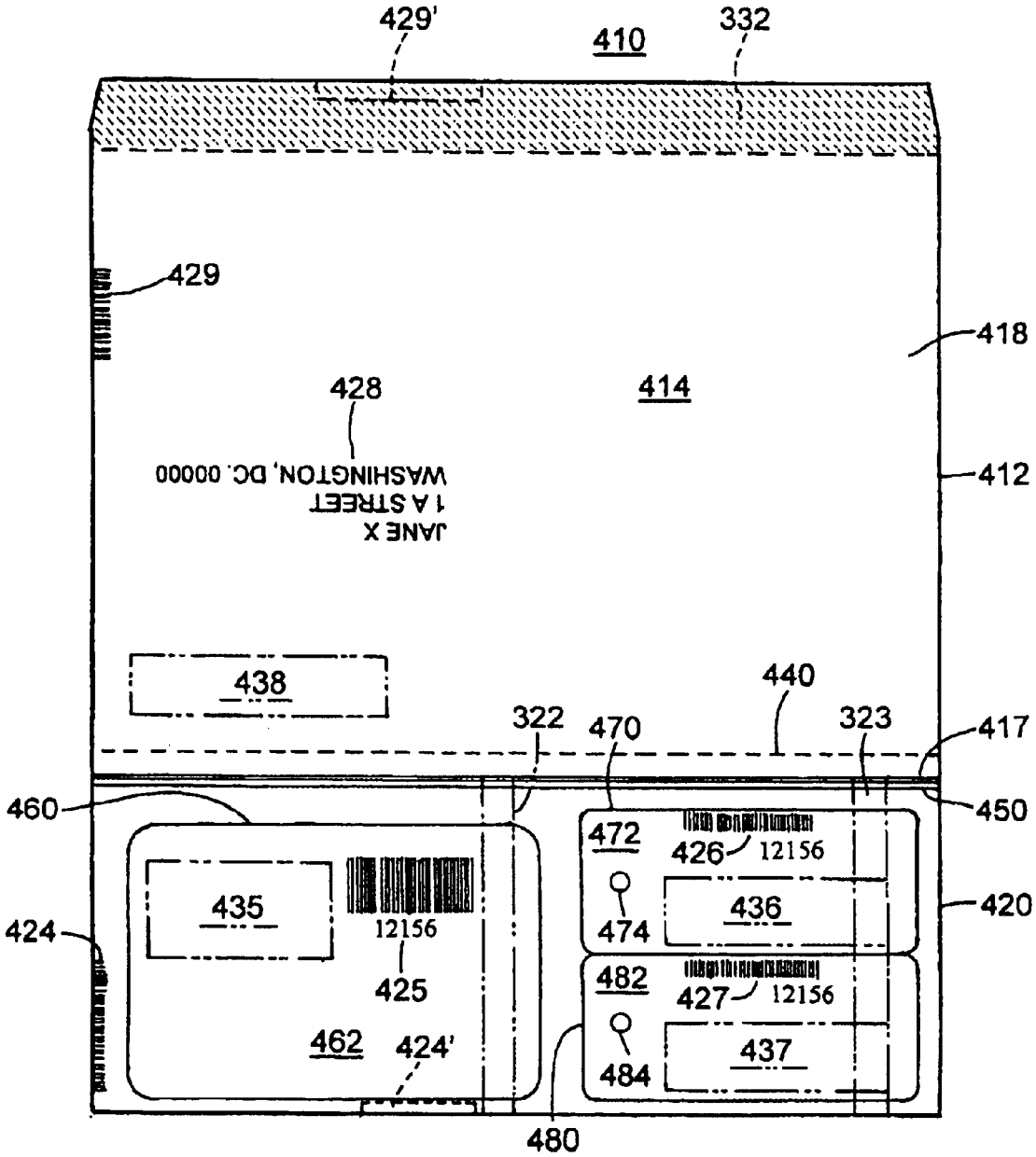
FIG. 13 is a block diagram of one possible set of steps for fabricating the sheet product of FIG. 12.

FIG. 13 depicts a series of steps for one preferred method to fabricate a sheet product 410. The first and second core strips 418, 420 are preferably first printed with their variable data fields and any static graphic fields at step 490. Depending upon how they are printed, individual core strips 418 or 418 and 420 may be cut from longer lengths containing a plurality of different sets of variable data fields 424–427 and/or 428–429. Core strips 418 and 420 are thereafter joined together side-by-side by the application of one (or two) cover strip(s) at step 492. Again, two cover strips can be applied simultaneously or sequentially in a manner appropriate for the materials selected, preferably to form a lamination with the core strips 418, 420 and each cover strip 440 and/or 450. Next, the laminated sheet products is scored at step 494 to define the removable element 462, 472, 482 as well as any closed perimeter key ring hole(s) 474, 484, line of perforation 434, and to separate individual self-mailers 310 from one another if multiple self-mailers were being simultaneously made. After scoring, an adhesive is applied at step 496 and the mailer folded and sealed at 498 or the two operations combined in a single step at 498'. In addition, at some point preferably after the joining step 492 and before the adhesive application step 496, each of the two edge-positioned variable data fields 424 and 429 are machine-read and the two codes recorded in a common data set to identify the unique numeric code of the second core strip variable data fields 424–427 assigned to the individual whose name and address is indicated at variable data field 428.

It will be appreciated that the individual variable data fields 424 and 429 can be otherwise located and read at different stages. For example, referring back to FIG. 12, the variable data field may alternatively be located at locations 424' and 429' and read before or as the two core strips were being joined in step 492 or in any of the subsequent steps prior to the folding and closure step(s) 498, 498'.

While two embodiment self-mailers have been disclosed in detail and several variations to them suggested in their descriptions, still other variations will occur to those of ordinary still in the art and are intended to be included as part of the invention. These variations are currently less preferred because, at the present time with available equipment, they would be more difficult to make or involve more steps and/or greater cost. For example, the unique numeric codes can be applied to the second core strip of the self-mailer in the manner indicated above, machine-read after the first and second core strips were joined, and then used to control a printer printing the name and address of the unique individual to whom the mailer was to be send on the second core strip, preferably at some point after the first and second core strips are joined together in step 492. Clearly, other possible arrangements of data on self-mailers and forms of self-mailers can be provided. Also while a printed bar code is preferred for ease of manufacture and/or use, printed magnetic codes can also be used. Furthermore, the size of the mailer can vary from that depicted and the length dimensions of the core strips can vary with the length of the first core strip forming the outer cover of the mailer preferably greater than the length of the contained second core strip bearing the removable card elements. Furthermore, instead of a one-piece, integral first cover strip joining the two core strips together and overlapping the removable printed elements, the self-mailer sheet products can be provided with separate cover strips, one joining together ends of the first and second core strips and another separate cover strip overlapping those portions of the second core strip forming the removable element(s) on the same side of the core as the first strip.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An integral printed self-mailer sheet product comprising:

a generally planar core having first and second opposing major planar sides, the core being formed by first and second core strips of different materials positioned side-by-side, the planar core being printed on its major sides with a plurality of variable data fields, at least a first variable data field being printed with a name and address of an individual person and at least a second variable data field being printed with a unique numeric code in a machine readable format assigned the individual person, at least two of the plurality of variable data fields being printed on the second core strip;

a first cover strip permanently fixed to one major side of each of the first and second core strips irremovably holding adjoining ends of the first and second core strips together in a joint to define the generally planar core, the first cover strip only partially covering one major side of the first core strip and at least partially covering one major side of the second core strip;

scoring extending at least sufficiently through the sheet product in the second core strip to define at least a first printed element removable from a remainder of the sheet product, the first removable printed element including only a portion of the second core strip bearing at least one of the at least two variable data fields printed on the second core strip;

the second core strip having a width in a direction perpendicular to the joint between the first and second core strips and a length in direction parallel to the joint; and the first core strip having a width in a direction perpendicular to the joint at least twice as great as the width of the second core strip.

2. The sheet product of claim 1 wherein the first cover strip spans a portion of the second core strip including the first removable printed element and the scoring defining the first removable printed element further extends through the first cover strip.

3. The sheet product of claim 1 wherein the first planar strip comprises a cellulose material and the second planar strip comprises a polymer material.

4. The sheet product of claim 1 wherein the second planar strip consists essentially of a polymer material.

5. The sheet product of claim 4 wherein the first planar strip consists essentially of a cellulose material.

6. The sheet product of claim 1 wherein the scoring defines a second printed element including the second variable data field printed on the second core strip removable from a remainder of the second core strip and from the first core strip.

7. The sheet product of claim 1 wherein one of the plurality of variable data fields is printed in at least machine readable format along an outer edge of both the second core strip and the printed sheet product.

*8. An elongated integral printed identification element comprising:*

*a core having opposing first and second major planar sides and bearing printing on at least one of the major planar sides, the core being coextensive in area with the element, the core and the element having a common width and a common length generally perpendicular to the width, the length being greater than the width such that the core and the element have a pair of opposing longitudinal ends at opposite ends of the length;*

*a magnetic stripe permanently fixed over one of the opposing major planar sides of the core extending across the width of the core proximal one of the pair of longitudinal ends; and*

*a closed perimeter opening extending entirely through the core and the element proximal a remaining one of the pair of longitudinal ends.*

*9. The element of claim 8 wherein the printing includes at least one variable data field with a unique code assigned to an individual to receive the element.*

*10. The element of claim 9 wherein the unique code is printed in a bar code format.*

*11. The element of claim 10 wherein the unique code is printed on the one major side of the core bearing the magnetic stripe.*

*12. The element of claim 9 wherein the unique code is printed in numeral format.*

*13. The element of claim 12 wherein the unique code is printed on the one major side of the core bearing the magnetic stripe.*

*14. The element of claim 9 wherein the unique code is printed on the core in both numeral and bar code formats.*

*15. The element of claim 14 wherein the unique code is printed at least in the bar code format on the one major side of the core bearing the magnetic stripe.*

*16. The element of claim 8 further comprising a first transparent cover strip fixed over one of the first and second major sides of the core, the magnetic stripe extending across the first transparent cover strip.*

*17. The element of claim 16 wherein each of the first transparent cover strip and the core is a different flexible web material.*

*18. The element of claim 16 further comprising a second transparent cover strip fixedly secured over a remaining one of the first and second major sides of the core.*

*19. The element of claim 16 wherein each of the first and second transparent cover strips and the core is a flexible web material.*

*20. An integral printed sheet product comprising:*

*a core having opposing first and second major planar sides and bearing printing on at least one of the sides;*

*a magnetic stripe permanently fixed over one of the opposing major planar sides of the core and extending across the sheet product; and*

*scoring extending at least sufficiently through the sheet product and the core to define at least a first elongated integral element removable from a remainder of the sheet product, the removable first elongated integral element having a pair of opposing longitudinal ends, the first elongated integral element further including at least a portion of the magnetic stripe extending across the element proximal one the pair of longitudinal ends of the element, and the scoring further defining a closed perimeter opening extending through the element proximal a remaining one of the pair of longitudinal ends of the element and spaced away from the magnetic stripe.*

*21. The printed sheet product of claim 20 further comprising a first flexible transparent cover strip fixedly secured to one of the first and second major planar sides of the core, the scoring extending through the first transparent cover strip with only part of the first transparent cover strip covering one major planar side of the core portion of the removable first elongated integral element and a remainder of the first transparent cover strip overlying at least part of a remaining portion of the core outside the scoring defining the removable first elongated integral element.*

*22. The printed sheet product of claim 20 wherein the scoring defines a second elongated integral element removable from a remainder of the sheet product, the second elongated integral element having a pair of opposing longitudinal ends.*

*23. The printed sheet product of claim 22 further comprising at least part of a magnetic stripe extending across one major side of the second removable elongated integral element proximal one longitudinal end of the second removable elongated integral element.*

*24. The printed sheet product of claim 23 wherein the scoring further defines a closed perimeter opening entirely the removable second elongated integral element proximal a remaining one of the pair of opposing longitudinal ends.*

*25. The printed sheet product of claim 24 wherein the removable second elongated integral element bears at least a second one of the variable code fields printed with the one unique code.*

*26. The printed sheet product of claim 24 further comprising a second flexible transparent cover strip fixedly secured to a remaining one of the first and second major planar sides of the core, the scoring extending through the second transparent cover strip with only part of the second transparent cover strip covering a remaining major planar side of the core portions of the removable first and second elongated integral elements and a remainder of the second transparent cover strip overlying at least part of a remaining portion of the core outside the scoring defining the removable first and second elongated integral elements.*

*27. The printed sheet product of claim 21 further comprising a second flexible transparent cover strip fixedly secured to a remaining one of the first and second major planar sides of the core, the scoring extending through the second transparent cover strip with only part of the second transparent cover strip covering a remaining major planar side of the core portion of the removable first elongated integral element and a remainder of the second transparent cover strip overlying at least part of a remaining portion of the core outside the scoring defining the removable first elongated integral element.*

*28. The printed sheet product of claim 21 wherein the printing on the core includes at least a plurality of variable data fields, each of at least two of the plurality of variable data fields being printed with one unique code assigned to an individual to receive the sheet product.*

*29. The printed sheet product of claim 28 wherein at least one of the at least two variable data fields printed with the one unique code is located on the one side of the core bearing the magnetic stripe.*

*30. The printed sheet product of claim 28 wherein at least one of the at least two variable data fields printed with the one unique code is located on the removable first elongated integral element.*

*31. The printed sheet product of claim 30 wherein at least one of the at least two variable data fields printed with the one unique code located on the removable first elongated integral element is covered by the first, flexible transparent cover strip.*

*32. The printed sheet product of claim 30 wherein at least the one variable data field located on the removable first elongated integral element is located on the one side of the core bearing the magnetic stripe.*

*33. The printed sheet product of claim 30 wherein at least the one variable data field located on the removable first elongated integral element is printed in at least bar code format.*

*34. The printed sheet product of claim 30 wherein at least the one variable data field located on the removable first elongated integral element is printed in at least numeral format.*

*35. The printed sheet product of claim 30 wherein at least another of the at least two variable data fields printed with the one unique code is printed on a remaining portion of the core outside the scoring defining the removable first elongated integral element.*

*36. The printed sheet product of claim 35 wherein at least part of the remaining portion of the core outside the scoring defining the removable first elongated integral element further bears an exposed strip of adhesive.*

*37. The printed sheet product of claim 36 wherein at least the part of the remaining portion of the core bearing the exposed strip of adhesive is separated from a portion of the core including the scoring defining the removable first elongated integral element by a line of perforations spaced from the scoring and extending through and across the core.*

*38. The printed sheet product of claim 28 wherein the scoring defines a second elongated integral element removable from a remaining portion of the sheet product and bearing at least another of the at least two variable data fields printed with the one unique code.*

*39. The printed sheet product of claim 28 wherein at least another of the at least two variable data fields printed with the one unique code is printed on the removable second elongated integral element.*

*40. The printed sheet product of claim 39 wherein the scoring defines a closed perimeter opening entirely through the removable second elongated integral element proximal one longitudinal end of the removable second elongated integral element.*

* * * * *

UNITED STATES PATENT AND TRADEMARK OFFICE

CERTIFICATE OF CORRECTION

PATENT NO. : RE41,925 E
APPLICATION NO. : 10/040107
DATED : November 16, 2010
INVENTOR(S) : Richard O. Warther It is certified that error appears in the above-identified patent and that said Letters Patent is hereby corrected as shown below:

Column 1, line 8, above the heading, "RELATED APPLICATION(S)" insert: -- Notice: More than one reissue application has been filed for the reissue of patent 6,010,159. The reissue applications are application numbers 12/912,846 (a divisional reissue application of 10/040,107, now Patent No. RE41,925) and 10/040,107, now Patent No. RE41,925, (a patented reissue application of Patent No. 6,010,159). --

Signed and Sealed this
First Day of October, 2013

Teresa Stanek Rea
*Acting Director of the United States Patent and Trademark Office*